United States Patent [19]

Karoly et al.

[11] 4,107,353

[45] Aug. 15, 1978

[54] METHOD FOR PHOTOPOLYMERIZATION OF PIGMENTED EPOXIDE COMPOSITIONS

[75] Inventors: Gabriel Karoly, Springfield, N.J.; John L. Gardon, Birmingham, Mich.

[73] Assignee: American Can Company, Greenwich, Conn.

[21] Appl. No.: 663,919

[22] Filed: Mar. 4, 1976

Related U.S. Application Data

[60] Continuation-in-part of Ser. No. 436,479, Jan. 25, 1974, abandoned, which is a division of Ser. No. 228,317, Feb. 22, 1972, abandoned.

[51] Int. Cl.² .................. B05C 5/00; B05C 17/04
[52] U.S. Cl. .................. 427/54; 204/159.11; 204/159.14; 260/37 EP; 260/830 TW; 260/836; 260/837 R; 428/418; 528/93; 528/112; 528/113; 528/361; 528/408
[58] Field of Search .............. 204/159.11, 159.14; 260/836, 837 R; 427/54

[56] References Cited

U.S. PATENT DOCUMENTS

| 3,205,157 | 9/1965 | Licori et al. .................. 204/159.11 |
| 3,328,319 | 6/1967 | Galinke et al. .................. 260/2 |
| 3,709,861 | 1/1973 | Anderson .................. 260/47 EC |
| 3,711,390 | 1/1973 | Feinberg .................. 204/159.11 |
| 3,711,391 | 1/1973 | Feinberg .................. 204/159.11 |
| 3,714,006 | 1/1973 | Anderson .................. 204/159.14 |

*Primary Examiner*—Richard B. Turer
*Attorney, Agent, or Firm*—Robert P. Auber; Ira S. Dorman; Ernestine C. Bartlett

[57] ABSTRACT

Highly pigmented liquid epoxide coating compositions containing one or more liquid epoxides, up to 60% by weight of pigment, one or more carboxylic acid anhydrides and specified diazonium salts of Lewis acids are converted to solid materials with substantially no weight loss following a relatively short exposure to ultraviolet radiation. The heretofore unattainable objective of a light-curable, substantially solventless coating composition containing sufficient pigment to obtain acceptable levels of hiding power is achieved by the presence of the carboxylic acid anhydride.

7 Claims, No Drawings

4,107,353

METHOD FOR PHOTOPOLYMERIZATION OF PIGMENTED EPOXIDE COMPOSITIONS

BACKGROUND

This application is a continuation-in-part of application Ser. No. 436,479, filed on Jan. 25, 1974, now abandoned, which in turn is a divisional of application Ser. No. 228,317, filed on Feb. 22, 1972 and now abandoned.

This invention relates to a method for preparing solid, highly pigmented coatings on a variety of substrates using liquid compositions containing specified epoxides, liquid carboxylic acid anhydrides, catalysts, and up to 60% by weight of one or more pigments. The compositions are solvent free, in that substantially all of the liquid phase comprises epoxides and compounds which react with epoxides to yield polymeric products.

Clear or slightly pigmented solid coatings exhibiting desirable levels of hardness and solvent resistance can be prepared by polymerizing epoxides in the presence of strong Lewis acids produced when certain diazonium salts, i.e. the fluoroborates, are irradiated with ultraviolet light, as disclosed in U.S. Pat. No. 3,205,157. Up until now it has not been possible to use these catalysts and ultraviolet light for the preparation of commercially useful coatings from liquid epoxide compositions which contain sufficient pigment to obtain the high level of hiding power desired for many end-use applications and which exhibit substantially no weight loss during processing.

When applied in sufficient thickness to obtain the desired level of hiding power, highly pigmented coatings containing one or more epoxide monomers or telomers as the sole or substantially sole component of the liquid phase are not converted to solid materials when exposed to ultraviolet light in the presence of diazonium salts of Lewis acids as the polymerization catalyst. The coatings may be dry to the touch following irradiation; however, the material below the surface is often uncured or insufficiently cured to obtain significant adhesion to the substrate. In some instances the coating can be easily lifted off the substrate.

It is known that epoxides can be polymerized at elevated temperatures in the presence of various acidic and basic catalysts. This technology has not been considered applicable to the production of coatings due to the relatively long heating period usually required to obtain a solid material from catalyzed compositions having a sufficiently long "pot life" or processability at ambient temperatures.

It has now been found that by combining the epoxide component with a liquid comprising one or more anhydrides of di- or polycarboxylic acids, highly pigmented compositions containing up to 60% by weight and more of pigment are converted to hard, solid coatings following exposure times of ten seconds or less to ultraviolet light in the presence of certain aryl diazonium compounds.

An objective of this invention is to provide a method for rapidly preparing hard, glossy, coatings from epoxide compositions which contain sufficient pigment to provide the desired level of hiding power in the cured coating.

SUMMARY OF THE INVENTION

The present invention pertains to a method for rapidly polymerizing liquid, pigmented compositions comprising at least one epoxide, at least one carboxylic acid anhydride, a latent catalyst, and up to 60% by weight of one or more pigments to yield solid coatings of acceptable hiding power. The reactive portion of the compositions comprise (a) at least one epoxide selected from the group consisting of (1) liquid di- and polyglycidyl ethers of the general formula

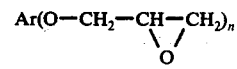

and low molecular weight liquid polymers thereof wherein Ar represents an aryl or alkaryl hydrocarbon radical and $n$ is the integer 1, 2, or 3 and (2) liquid compounds containing two or more divalent radicals of the formula

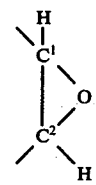

wherein $C^1$ and $C^2$ are part of a five- or six-membered carboxylic ring structure, which may in turn be part of a larger molecule and (b) at least one carboxylic acid anhydride selected from the group consisting of liquid anhydrides of dicarboxylic acids, polycarboxylic acids and liquid mixtures containing two or more anhydrides of dicarboxylic or polycarboxylic acids, with the proviso that the composition contains 1.8 or more equivalent weights of epoxide per equivalent weight of acid anhydride. The present latent catalysts are aryl diazonium compounds corresponding to the general formula

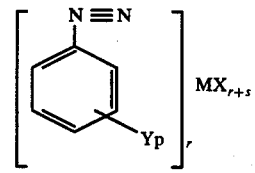

wherein X is halogen and M is an element selected from the group consisting of antimony, arsenic, bismuth, boron, iron, phosphorus and tin. Each Y is individually selected from the group consisting of nitro, hydroxyl, halogen, N-morpholine, alkyl, alkoxy, aryl, amino, arylamino, alkylamino and arylmercapto radicals; $p$ is an integer between 1 and 5, inclusive; $r$ is an integer equal to the absolute value of the charge on the complex anion $M_{r+s}$ and $s$ is an integer equal to the valence state of the element M.

DETAILED DESCRIPTION OF THE INVENTION

Liquid pigmented compositions that incorporate the epoxides, carboxylic acid anhydrides and catalysts of this invention are useful as coating materials for metal, paper, plastics and a variety of other substrates. When coatings of the liquid compositions are exposed for short periods of time to a suitable source of ultraviolet radiation, they develop a dry, glossy, non-tacky surface and an adherence to the substrate which is quite surprising considering the opacity resulting from the relatively large amount of pigment present in the composition. As will be demonstrated in the accompanying examples, this effect is not observed with compositions wherein the acid anhydride is omitted. The exposure time required to obtain a solid coating may be 10 seconds or less using the present method with preferred compositions described in the following sections of this application.

A. THE EPOXIDE COMPONENT

One class of epoxides suitable for use in accordance with the present method are glycidyl ethers derived from compounds containing one or more hydroxyl groups which are bonded to carbon atoms of aromatic ring structures. This class exhibits the general formula

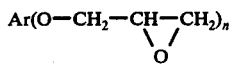

wherein Ar represents an aryl or an alkaryl hydrocarbon radical and $n$ represents an integer between 1 and 10, inclusive. The hydrocarbon radicals represented by Ar contain one or more aromatic hydrocarbon structures, e.g. phenyl and naphthyl radicals. If Ar contains a plurality of aromatic ring structures, these may be bonded directly to one another, as in a biphenyl radical, or the ring structures may be separated by alkylene or other divalent radical, as in the compound 2,2-bis(4,4'-hydroxyphenyl) propane, sometimes referred to as "Bisphenol A". The diglycidyl ether of Bisphenol A is one of those preferred for use in the subject invention. Glycidyl ethers suitable for use in the present coating compositions exhibit a viscosity less than about 20,000 centipoises at ambient temperature, and may be low molecular weight polymers of the compound represented by the foregoing general formula.

Other useful epoxides of this class contain between 2 and 10 epoxide radicals

per molecule, e.g. the glycidyl ethers of phenol-formaldehyde novolac resins, and glycidyl ethers of compounds containing more than one hydroxyl radical bonded to an aromatic ring structure, e.g. resorcinol.

The second class of liquid epoxides suitable for use in the present coating compositions is one wherein the carbon atoms of at least one of the epoxide radicals are part of a five or six-membered structure which may in turn be part of a larger molecule. Preferred compounds of this class include compounds of the formula:

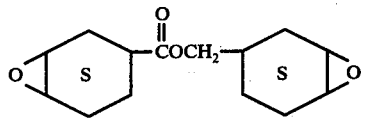

The crosslinked structure which is attained following polymerization of the aforementioned polyfunctional epoxides is considered essential for good appearance and high strength of the resultant coating.

The epoxides of both classes described hereinbefore may contain inert substituents, e.g. halogen, that will not react to any significant extent with the epoxide or other components of the coating composition at ambient temperature and in the absence of compounds that catalyze epoxide polymerization.

A number of useful commercially available epoxide monomers and telomers belonging to each of the two classes described in this section of the specification are listed in Chapter 4 of the publication entitled "Handbook of Epoxy Resins" by H. Lee and K. Neville (McGraw-Hill Book Company, New York, 1967).

B. THE CARBOXYLIC ACID ANHYDRIDE COMPONENT

The present coating compositions contain one or more liquid anhydrides of dicarboxylic or polycarboxylic acids. Some anhydrides or dicarboxylic acids which are solid at ambient temperature, e.g. maleic anhydride and hexahydrophthalic anhydride, when combined with one another in specific proportions, will form eutectic mixtures with melting points below ambient temperature. These mixtures are useful in the present coating compositions and are described in the chemical literature. Suitable anhydrides and eutetic mixtures include methyltetrahydrophthalic anhydride (a Diels-Alder condensation product of maleic anhydride and isoprene), dodecenylsuccinic anhydride and a mixture containing 30% by weight of maleic anhydride and 70% by weight of hexahydrophthalic anhydride.

The present compositions contain 1.8 or more equivalent weights of epoxide per equivalent weight of acid anhydride. The use of excess epoxide is preferred. Depending upon the type of catalyst employed, experimental evidence indicates that a portion of the epoxide component undergoes rapid homopolymerization during exposure of the catalyzed coating composition to ultraviolet light or heat. The time required for any significant reaction to occur between epoxide and the acid anhydride to form ester residues

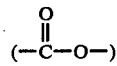

is considerably longer and may require several minutes to several days, depending upon the environmental temperature. An excess of epoxide is, therefore, desirable to ensure that a concentration of unreacted epoxide sufficient to react with substantially all of the anhydride will be present following the initial rapid homopolymerization of the epoxide component.

C. THE CATALYST

The photosensitive latent catalysts of this invention can be represented by the generic formula:

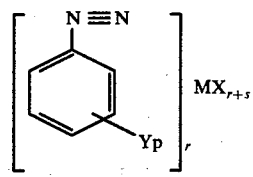

where X is halogen, M is a metal or metaloid selected from the group consisting of antimony, arsenic, bismuth, boron, iron, phosphorus and tin; and Y is selected from at least one of the group consisting of nitro, hydroxyl, halogen, N-morpholino, alkyl, alkoxy, aryl, amino, aryl amino, alkyl amino, and aryl mercapto radicals. In the above formula, it will be understood that $r$ is equal to the number of free halogen atoms which are released upon the exposure of the catalyst to actinic radiation to yield a Lewis Acid, $MX_s$, and that both the number of aryldiazonium radicals and the charge on the complex anion $MX_{r+s}$ is equal to $r$. The letter $p$ represents an integer between 1 and 5.

Halogen-containing complex ions corresponding to all possible valence states of the element M may not exist, or may be so unstable as to be useless for all practical purposes; however, one skilled in the art can readily select those diazonium salts which would be suitable for use in the coating compositions of this invention. At least a partial listing of complex ions which can be incorporated into the present diazonium salts is found in Appendix III of the introduction to the subject index for Volume 56 (1962) of *Chemical Abstracts*, a publication of the American Chemical Society.

Specific examples of diazonium compounds which can be used in the present invention include:

p-chlorobenzenediazonium hexafluorophosphate
o-nitrobenzenediazonium hexafluorophosphate
2,5-dichlorobenzenediazonium hexafluorophosphate
p-N-morpholinophenyldiazonium hexafluorophosphate
2,5-diethoxy-4-(p-tolyl) benzenediazonium hexafluorophosphate
2-chloro-4-dimethylamino-5-methoxyphenyldiazonium hexafluorophosphate
2,5-diethoxy-4-p-tolymercaptobenzenediazonium hexafluorophosphate
2,5-dimethoxy-4-N-morpholinobenzenediazonium hexafluorophosphate
2,5-diethoxy-4-ethoxyphenylbenzenediazonium hexafluorophosphate
p-nitrobenzenediazonium nexafluoroarsenate
p-N-morpholinophenyldiazonium hexafluoroarsenate
2,4-dichlorobenzenediazonium hexachloroantimonate
p-nitrobenzenediazonium hexafluoroantimonate
p-N-morpholinophenyldiazonium hexafluoroantimonate
2,5-dichlorobenzenediazonium hexachloroantimonate
2,5-dichlorobenzenediazonium hexafluoroantimonate
2,4-dichlorobenzenediazonium tetrachlorobismuthate
o-nitrobenzenediazonium tetrachlorobismuthate
2,4-dichlorobenzenediazonium tetrachloroferrate
o-hydroxybenzenediazonium hexafluorophosphate
p-hydroxybenzenediazonium hexafluorophosphate
2,5-dichlorobenzenediazonium tetrafluoroborate The diazonium compounds can be prepared from procedures known in the art and such preparation forms no part of the present invention. The chlorometallic complexes may be prepared, for example, in accordance with the method set forth by Lee et al. in *Journal of the American Chemical Society*, 83, 1928 (1961). Diazonium hexafluorophosphates can be prepared by diazotizing the corresponding aniline derivative with $NOPF_6$, which in turn is prepared by the addition of $HPF_6$ or a hexafluorophosphate salt to a mixture of hydrogen chloride and sodium nitrite, or by the addition of a hexafluorophosphate salt to a solubilized diazonium salt to yield an insoluble product. The N-morpholino complexes can be prepared either from the aniline derivative or by adding an aqueous solution of the desired inorganic complex salt to a solution of N-morpholinophenyldiazonium fluoroborate.

The reaction which is believed to occur upon irradiation of a latent catalyst with ultraviolet light can be represented by the following equation:

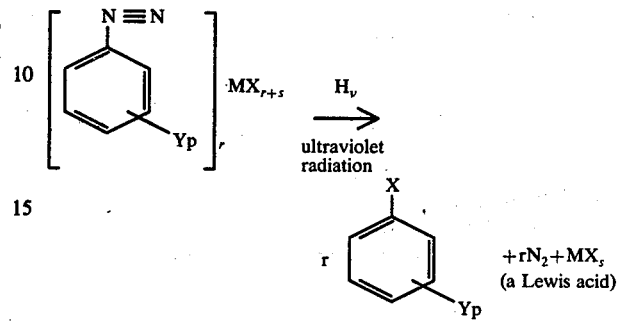

wherein the terms M, X, Y and the integers $p$, $r$, and $s$ have been defined previously. Exposure of the aryldiazonium catalyst to ultraviolet radiation of the proper energy level and wavelength produces a Lewis acid represented by the formula $MX_s$. The term Lewis acid refers to an electron pair acceptor such as $PF_3$, $FeCl_3$, $AsF_5$, $SbF_5$, $SnCl_4$, $BF_3$, or $BiCl_3$. The Lewis acid initiates or catalyzes a rapid polymerization of the epoxide component of the coating composition.

The radiation employed to decompose the aryldiazonium compound can be generated using any suitable source, for example, a mercury or xenon lamp. The only limitation placed on the radiation source is that it must have a frequency range and energy level sufficient to decompose a major portion of the arylidiazonium compound.

D. THE PIGMENT

The coating compositions which are advantageously employed in accordance with the present method contain sufficient pigment to impart an acceptable level of hiding power to the final cured coating. It will be understood that the minimum concentration of pigment required to achieve this goal will depend upon the hiding power of the particular pigment. Titanium dioxide exhibits a uniquely high level of hiding power relative to other pigments and is therefore preferred for use in many compositions. Colored coatings can be obtained by combining titanium dioxide with the desired colored pigment or dye.

Coating compositions containing as much as 60% by weight or more of pigment can be polymerized using the present method.

E. SOLVENT

Some of the catalysts of this invention may not be readily soluble at ambient temperature in the epoxide, the anhydride or mixtures containing these two components. Heating of the epoxide should be avoided, since this may initiate a spontaneous, exothermic polymerization. To obtain a homogeneous liquid composition it may therefore be desirable to dissolve the catalyst in a small amount of a liquid which may or may not be a reactive solvent, i.e. one which forms compounds with epoxides and/or carboxylic anhydrides. The catalyst solvent comprises up to 5% by weight, preferably less than 2%, of the total coating composition.

Acetonitrile is a preferred solvent for the diazonium type catalysts, since in addition to dissolving the catalyst it is a weak Lewis base which will react with trace amounts of Lewis acids resulting from premature catalyst decomposition, thereby preventing spontaneous polymerization of the epoxide component in the absence of ultraviolet light. Other suitable solvents for the diazonium catalysts include propylene carbonate, benzonitrile, acetone, toluene, xylene and methyl ethyl ketone.

F. PREPARATION OF COATING COMPOSITIONS

The present pigmented compositions are conveniently prepared using a roller mill or other known techniques for obtaining uniform dispersions of small solid particles in a liquid medium. The pigment may be dispersed in the epoxide, anhydride, or mixtures of these two components.

If a solvent for the catalyst is required, the catalyst is preferably dissolved in the solvent prior to blending with the other components. Traces of Lewis acid generated by spontaneous decomposition of the diazonium catalyst can initiate premature polymerization of the epoxide. Catalyzed compositions containing the epoxide should, therefore, not be stored for extended periods of time prior to use.

The concentration of diazonium catalyst in the composition is usually between about 0.25 to about 5 parts by weight of aryldiazonium compound to each one hundred parts by weight of coating compositions.

The pigmented compositions of this invention can be coated onto a variety of substrates, including metal, paper, wood, and various synthetic polymers. The coatings are applied using known techniques, which include wire-wound bars, doctor blades, and roller coaters. To obtain an optimum combination of rapid application, film coherency and controllable thickness, the viscosity of the composition is preferably between about 5 and 5,000 centipoises at ambient temperature.

G. POLYMERIZATION OF THE COATING COMPOSITIONS

Pigmented liquid coatings containing the diazonium catalysts of this invention are cured, i.e. converted to a hard, glossy, tack-free solid during a relatively short exposure to a source of ultraviolet light. The exposure time required to obtain a useful coating is a function of several variables, including coating thickness, light intensity and the type of catalyst. In many instances the exposure time is ten seconds or less, as will be demonstrated in the accompanying examples which illustrate preferred coating compositions together with methods for preparing and polymerizing these compositions. The examples should not be interpreted as limiting the scope of this invention.

EXAMPLE 1

(Control)

A solution of 2,5-diethoxy-4-(p-tolylmercapto) benzene diazonium hexafluorophosphate (0.1 g.) in 0.2 cc. of acetonitrile was combined with 10 g. of 3,4-epoxy cyclohexyl-(3,4-epoxy) cyclohexane carboxylate, available as ERL-4221 from the Union Carbide Corporation. A portion of the resultant composition was coated on a steel plate using a number 2 wire-wound "K-bar" distributed by the Gardner Laboratories, after which the coated side was exposed for 10 seconds at a distance of 3 inches (7.5 cm.) from a 430 watt mercury vapor lamp. During the exposure the liquid coating was converted to a hard, glossy solid material.

This example demonstrates that epoxide compounds can be polymerized by irradiating them with ultraviolet light in the presence of diazonium complexes of certain Lewis acids that are within the scope of the present method.

EXAMPLE 2

(Control)

This example demonstrates that pigmented epoxide compositions of adequate hiding power cannot be polymerized using the present latent catalysts in the presence of ultraviolet light if the acid anhydride is omitted from the formulation.

A homogeneous dispersion was prepared using 120 g. of titanium dioxide, and 80 g. of ERL-4221. An 8.25 g. portion of this material was blended with an additional 1.75 g. of ERL-4221. To this composition was added a solution of 0.1 g. of 2,5-diethoxy-4-(p-tolyl mercapto) benzene diazonium hexafluorophosphate in 0.2 g. of acetonitrile. Two steel plates were coated with this composition, the first plate using a number 1 wire-wound "K-bar", the second plate using a number 2 wire-wound "K-bar". Both plates were then exposed for 20 seconds at a distance of 3 inches from a 430 watt mercury vapor lamp. The coating on the first plate was 0.0001 inch (0.1 mil) thick and was completely cured. The 0.0004 inch (0.4 mil) thick coating on the second plate was cured only at the surface. Both coatings were considered unsatisfactory, the thinner coating because of insufficient hiding power (the base metal was visible) and the thicker coating because of insufficient adhesion to the metal substrate. The thicker coating could readily be peeled away from the metal substrate.

The following examples demonstrate preferred compositions suitable for use with the present method.

EXAMPLE 3

A homogeneous dispersion was prepared using 120 g. of titanium dioxide and 80 g. of the aforementioned ERL-4221. An 8.25 g. portion of this material was blended with a mixture containing 1.25 g. of methyltetrahydrophthalic anhydride. To this composition was added a solution of 0.1 g. of 2,5-diethoxy-4-(p-tolyl mercapto) benzene diazonium hexafluorophosphate in 0.2 g. of acetonitrile. A portion of this composition was coated onto a steel plate using a number 2 wire-bound "K-bar", (coating thickness = 0.0004 inch) and the coated side exposed for ten seconds at a distance of 3 inches (7.5 cm.) from a 430 watt mercury vapor lamp. During the exposure the liquid coating was converted to a white, opaque and glossy solid.

Good quality coatings of adequate hiding power were prepared using the foregoing procedure and ingredients, the only change being replacement of the diazonium catalyst with an equal weight of o- or p-hydroxyphenyl diazonium hexafluorophosphate or p-chlorophenyl diazonium hexafluorophosphate.

EXAMPLE 4

A liquid coating composition was prepared as described in Example 3, with the exception that 2.5 g. of methyltetrahydrophthalic anhydride and 1.09 of dodecenylsuccinic anhydride was used as the acid anhydride component. The exposure time required to obtain a solid coating was ten seconds.

EXAMPLE 5

This example demonstrates the poor coatings obtained using epoxide compounds that are outside the scope of this invention.

A homogeneous dispersion was prepared using 100 g. of titanium dioxide and 65 g. of 1,4-bis(2,3-epoxypropoxy) butane. An 8.25 g. portion of this material was blended with 1.75 g. of methyltetrahydraphthalic anhydride. To this composition was added a solution of 0.1 g. of 2,5-diethoxy 4-(p-tolyl mercapto) benzene diazonium hexafluorophosphate in 0.2 g. of acetonitrile. Two steel plates were coated with this composition, the first plate using a number 1 wire-wound "K-bar" and the second plate using a number 2 wire-wound "K-bar". Both plates were exposed for 20 seconds at a distance of 3 inches from a 430 watt mercury vapor lamp. Neither of the coatings were completely cured following the exposure.

To determine if the inability to cure the coating was due to the presence of pigment, an unpigmented coating formulation was prepared by blending a solution of 0.1 g. of p-chlorophenyl diazonium hexafluorophosphate in 0.2 cc. of acetonitrile with a homogeneous liquid mixture prepared by combining 6.5 g. of 1,4-bis(2,3-epoxypropoxy) butane with 3.5 grams of methyltetrahydrophthalic anhydride. A "tacky" partially cured coating was obtained when the composition was applied to a steel plate using a number 2 "K-bar" and the coating exposed for 20 seconds to a 430 watt mercury vapor lamp at a distance of 3 inches.

What is claimed is:

1. In an improved method for preparing pigmented epoxide coatings exhibiting satisfactory adhesion and containing pigment in an amount ranging from that amount sufficient to impart an acceptable level of hiding of the substrate up to about 60% by weight by polymerization of a liquid epoxide-containing composition that incorporates a latent polymerization catalyst and which contains at most insignificant amounts of unreactive liquid components, wherein (a) said composition contains at least one epoxide selected from the group consisting of those exhibiting the general formula

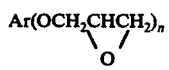

and low molecular weight telomers thereof and compounds containing at least two divalent radicals of the formula

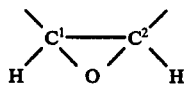

wherein Ar represents an aryl or alkaryl hydrocarbon radical, n is the integer 2 or 3 and $C^1$ and $C^2$ form part of a five-or six-membered carboxylic ring structure, said epoxide comprising at least a major portion of the epoxides present in said liquid epoxide-containing composition; and (b) said composition contains between 0.25 and 5%, based on the total weight of said composition, of a latent catalyst selected from aryl diazonium compounds exhibiting the general formula

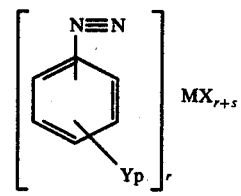

wherein X represents a halogen radical and M represents an element selected from the group consisting of arsenic, bismuth, boron, iron, phosphorus and tin; Y is selected from at least one of the groups consisting of nitro, hydroxyl, halogen, N-morpholino, alkyl, alkoxy, aryl, amino, arylamino, alkylamino and arylmercapto radicals, r is an integer equal to the absolute value of the charge on the complex anion $MX_{r+s}$, s is an integer equal to the valence state of M, and p is an integer between 1 and 5, inclusive; the improvements that comprise incorporating into said liquid epoxide-containing composition at least one carboxylic acid anhydride selected from the group consisting of liquid anhydrides of polycarboxylic acids and liquid mixtures containing two or more anhydrides of polycarboxylic acids, with the proviso that the composition contains at least 1.8 equivalent weights of epoxide per equivalent weight of said acid anhydride, applying the resultant liquid epoxide-containing composition to a substrate and exposing the resultant liquid coating to ultraviolet radiation for a period of time sufficient to decompose the latent catalyst and convert said coating to a dry solid material.

2. The improved method of claim 1 wherein the epoxide is a diepoxide.

3. The improved method of claim 1 wherein the carbon atoms of the epoxide radical represented by the formula

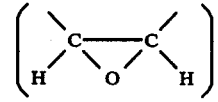

are part of a 6-membered carbocyclic ring.

4. The improved method of claim 1 wherein the epoxide is a liquid diglycidyl ether of Bis-phenol A [2,2-bis(4,4'-hydroxyphenyl) propane].

5. The improved method of claim 1 wherein the acid anhydride is selected from the group consisting of methyltetrahydrophthalic anhydride and liquid mixtures of methyltetrahydrophthalic anhydride and dodecenylsuccinic anhydride.

6. The improved method of claim 1 wherein the liquid coating is exposed to ultraviolet radiation for a maximum of 10 seconds.

7. The improved method of claim 1 wherein up to 5% by weight of a solvent for the latent catalyst is incorporated into the liquid epoxide-containing composition.